(12) United States Patent
Myouga

(10) Patent No.: US 10,095,442 B2
(45) Date of Patent: Oct. 9, 2018

(54) MEMORY DEVICE THAT CHANGES EXECUTION ORDER OF COMMANDS

(71) Applicant: Toshiba Memory Corporation, Tokyo (JP)

(72) Inventor: Nobuyuki Myouga, Iruma Saitama (JP)

(73) Assignee: Toshiba Memory Corporation, Tokyo (JP)

( * ) Notice: Subject to any disclaimer, the term of this patent is extended or adjusted under 35 U.S.C. 154(b) by 60 days.

(21) Appl. No.: 15/057,028

(22) Filed: Feb. 29, 2016

(65) Prior Publication Data

US 2017/0039002 A1    Feb. 9, 2017

Related U.S. Application Data

(60) Provisional application No. 62/200,703, filed on Aug. 4, 2015.

(51) Int. Cl.
*G06F 12/00* (2006.01)
*G06F 3/06* (2006.01)

(52) U.S. Cl.
CPC .......... *G06F 3/0659* (2013.01); *G06F 3/0605* (2013.01); *G06F 3/0611* (2013.01); *G06F 3/0673* (2013.01)

(58) Field of Classification Search
None
See application file for complete search history.

(56) References Cited

U.S. PATENT DOCUMENTS

| 5,940,612 | A | 8/1999 | Brady et al. |
| 8,782,295 | B2 | 7/2014 | Paragaonkar et al. |
| 2014/0281050 | A1* | 9/2014 | Vogan .................. G06F 3/0634 710/14 |

FOREIGN PATENT DOCUMENTS

| JP | H06119282 A | 4/1994 |
| JP | H07105120 A | 4/1995 |
| JP | 2008146420 A | 6/2008 |

* cited by examiner

*Primary Examiner* — Baboucarr Faal
(74) *Attorney, Agent, or Firm* — Patterson & Sheridan, LLP

(57) ABSTRACT

A memory device includes a memory unit, a communication interface through which commands are received from a plurality of hosts, and a controller configured to store the commands in a queue and determine an order of execution of the commands according to when the commands were added to the queue and whether or not the commands issued from a host that is designated as a priority host. The controller determines the commands issued from the priority host to be executed prior to other commands that were not issued from the priority host, and determines the other commands to be executed in the order they were added to the queue.

18 Claims, 18 Drawing Sheets

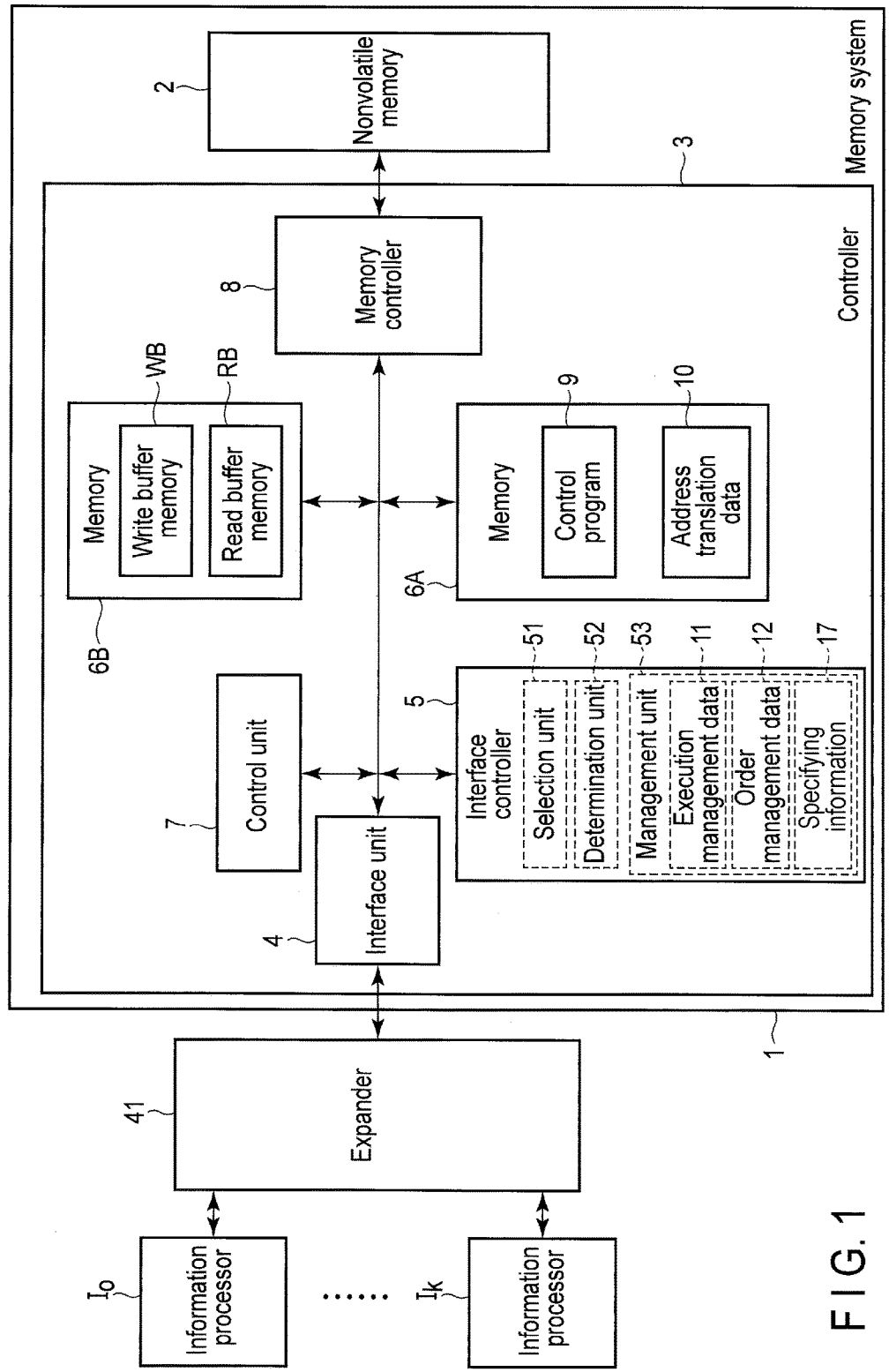
F I G. 1

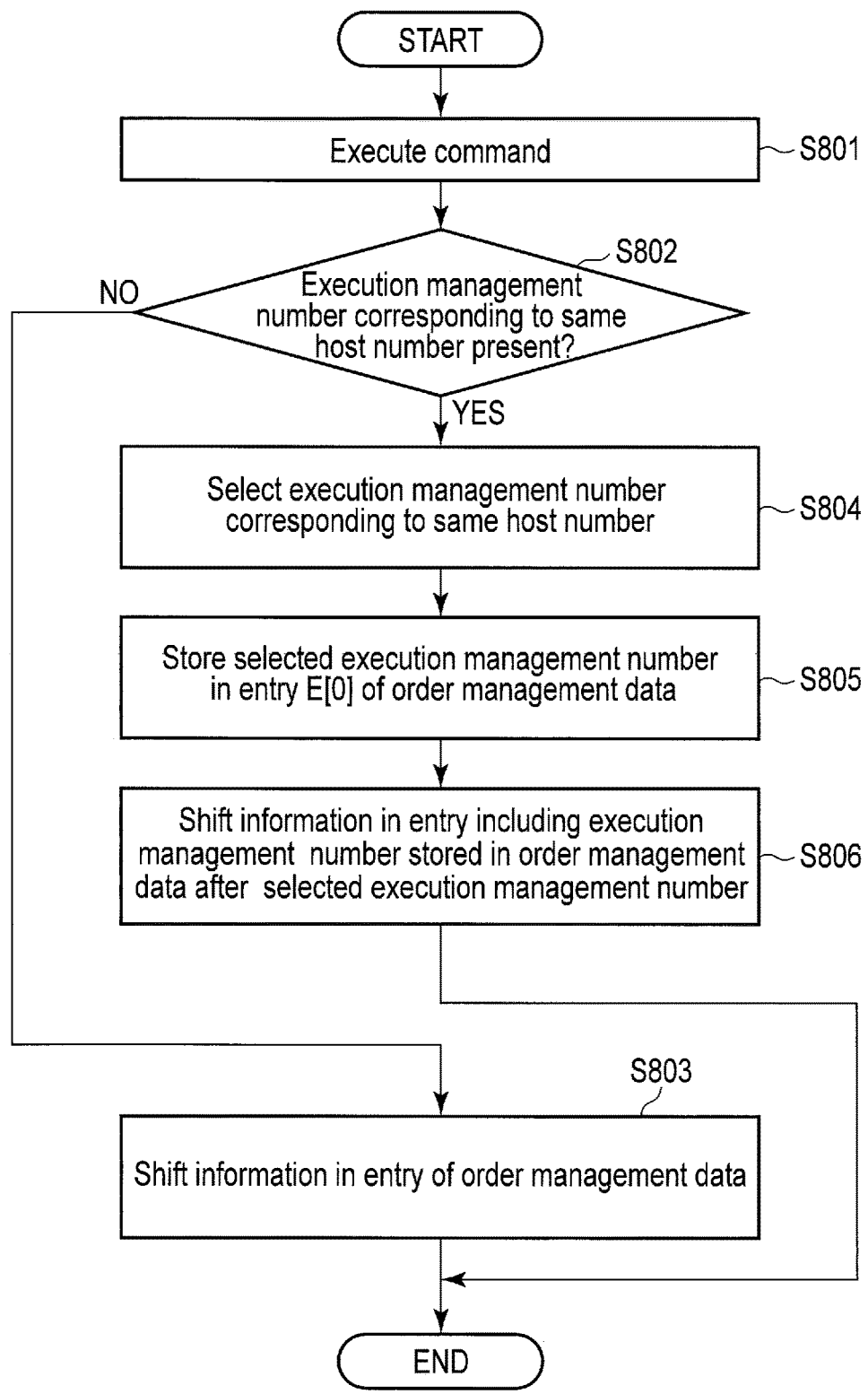
F I G. 8

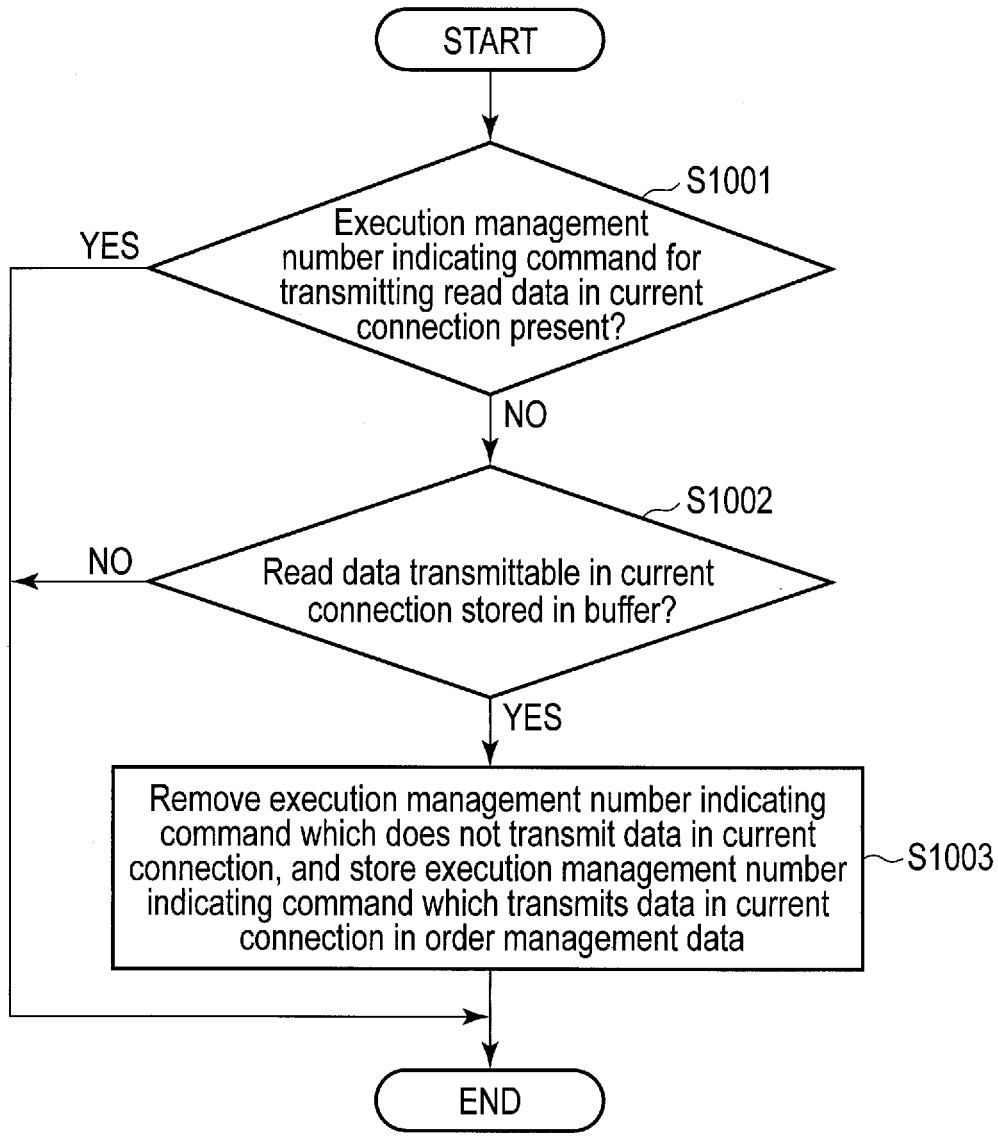
F I G. 10

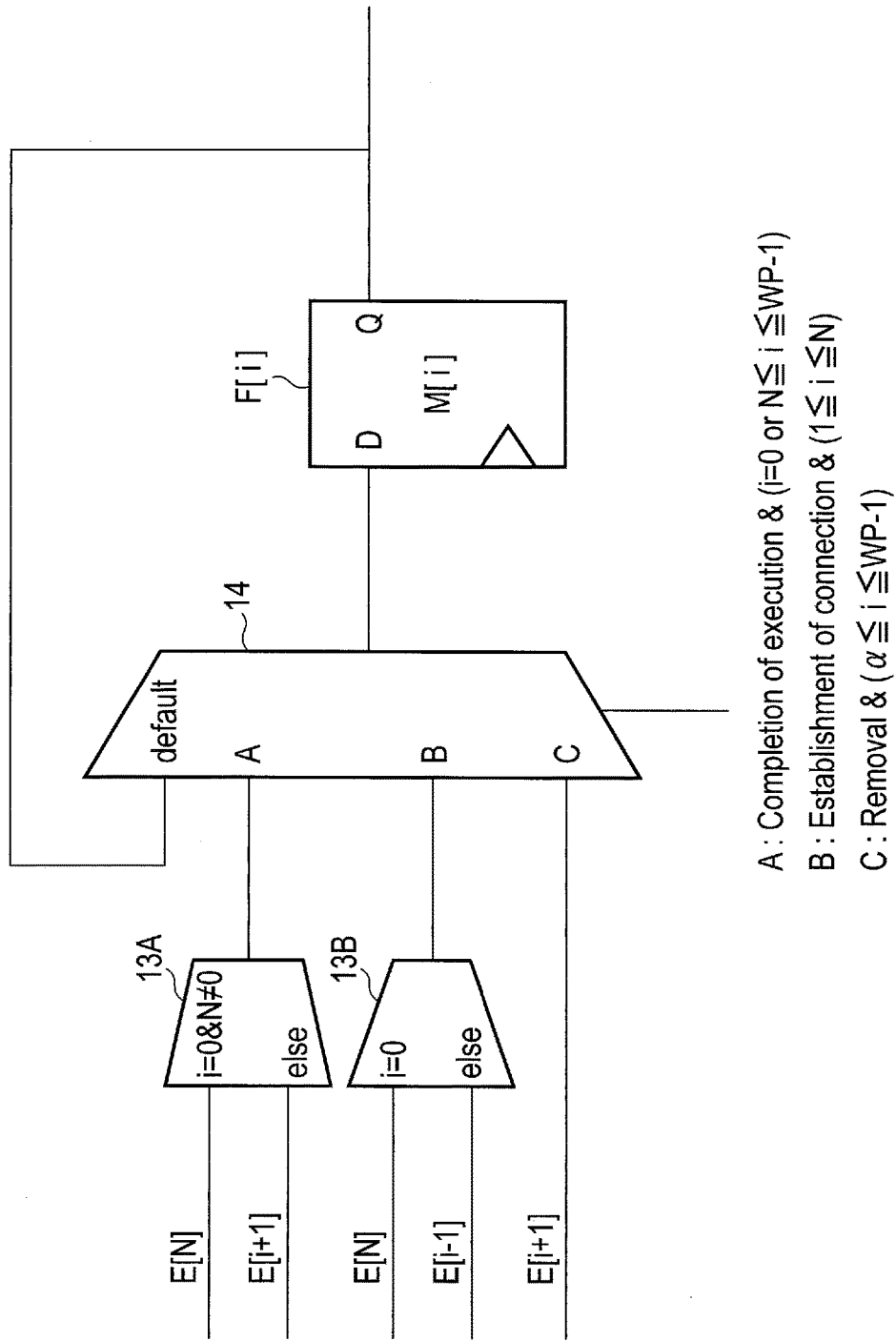
F I G. 11

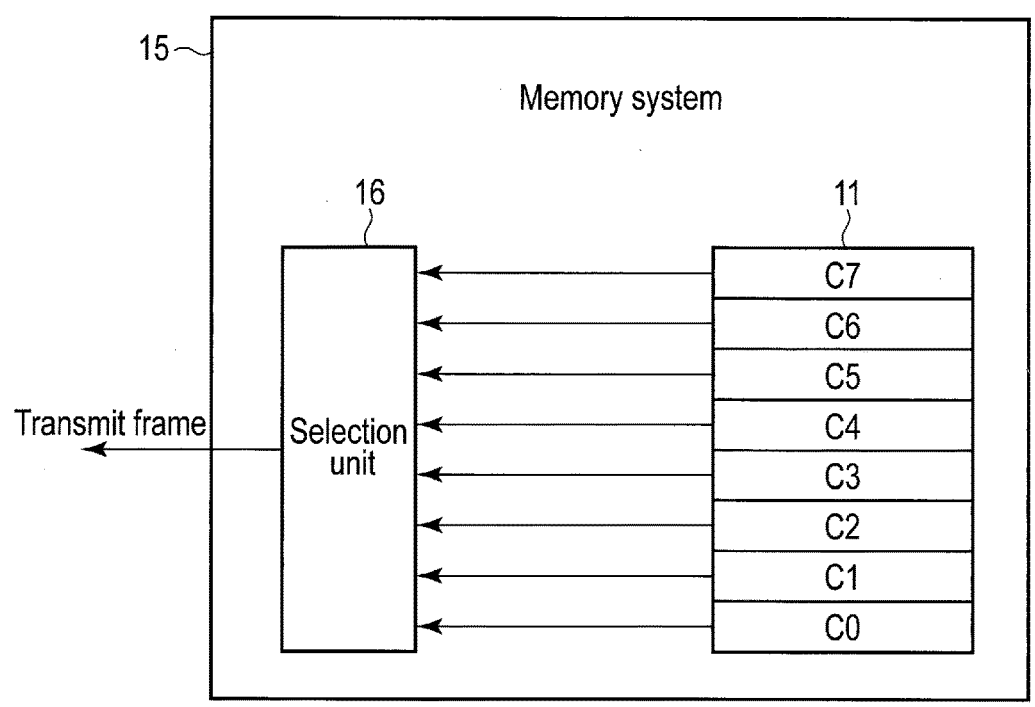
F I G. 12

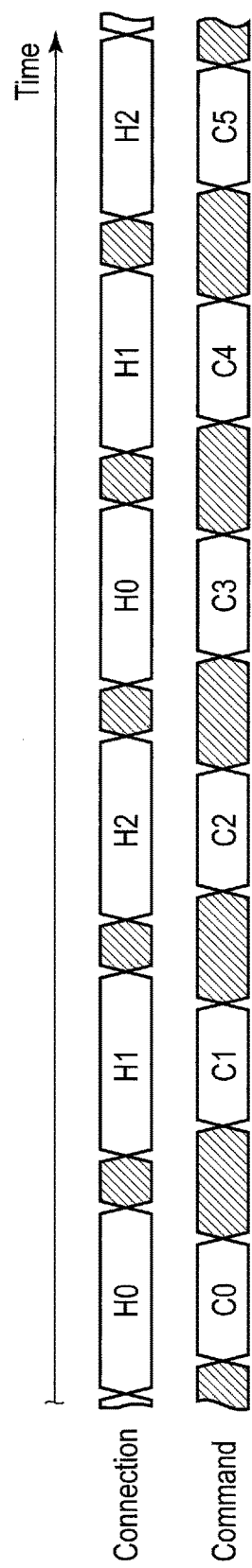
F I G. 14

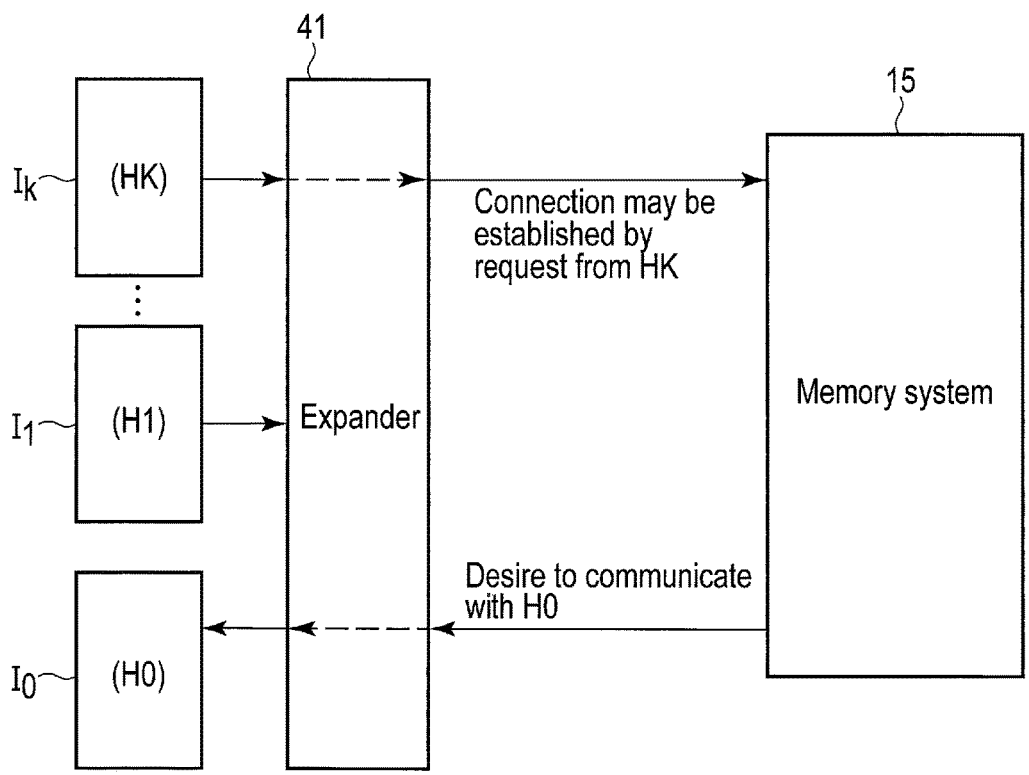
F I G. 15

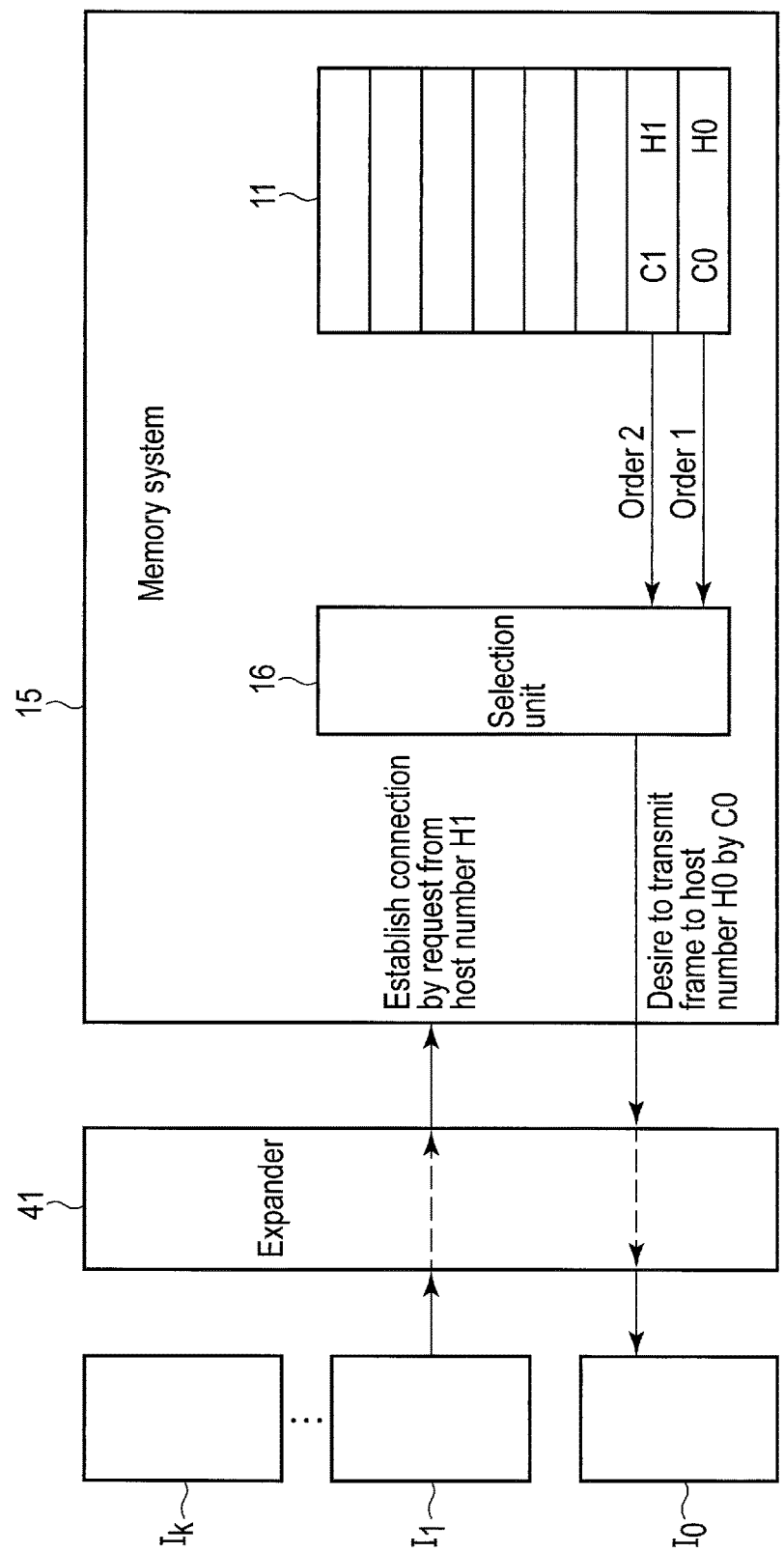
F I G. 16

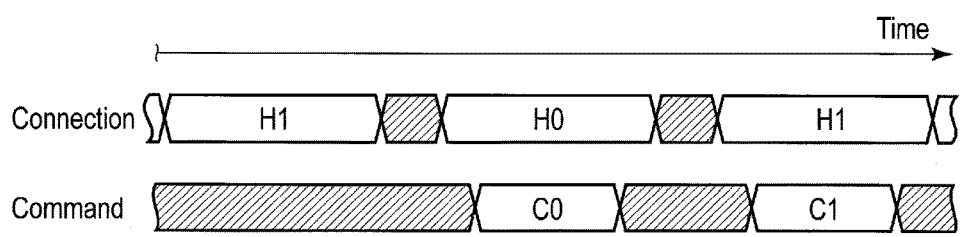
F I G. 17

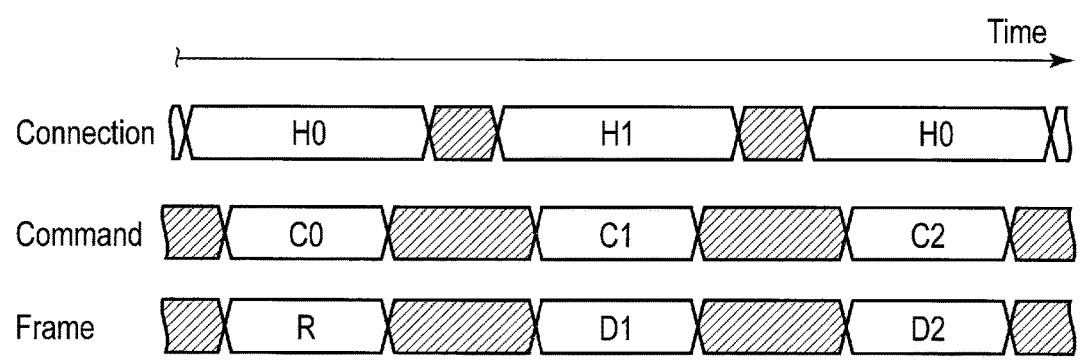
F I G. 19

MEMORY DEVICE THAT CHANGES EXECUTION ORDER OF COMMANDS

CROSS-REFERENCE TO RELATED APPLICATION

This application is based upon and claims the benefit of priority from the U.S. Provisional Patent Application No. 62/200,703, filed Aug. 4, 2015, the entire contents of which are incorporated herein by reference.

FIELD

Embodiments described herein relate generally to a memory device, in particular, a memory device that changes execution order of commands.

BACKGROUND

A memory device typically includes a controller and a nonvolatile memory. The controller receives a write command, a logical address, and write data from a host device through a data port thereof, translates the logical address into a physical address and writes the write data to a location in the nonvolatile memory corresponding to the physical address. Also, the controller receives a read command and a logical address from a host device through a data port thereof, translates the logical address into a physical address, reads the read data stored in the location in the nonvolatile memory corresponding to the physical address and transmits the read data to the host device.

BRIEF DESCRIPTION OF THE DRAWINGS

FIG. 1 is a block diagram of a memory system according to an embodiment.

FIG. 8 is a flowchart illustrating a process performed by the memory system according to the present embodiment.

FIG. 10 is a flowchart illustrating still another process performed by the memory system according to the present embodiment.

FIG. 11 is a circuit diagram of a circuit for shifting entries of the order management data according to the present embodiment.

FIG. 12 generally illustrates an operation carried out in the memory system according to a comparison example.

FIG. 14 is a timing diagram illustrating a connection state and a command execution state in the memory system according to the comparison example, in the first operation example.

FIG. 15 is a block diagram illustrating the memory system of the comparison example that is connected to one of information processors via an expander.

FIG. 16 illustrates a second operation example of an operation carried out by the memory system of the comparison example.

FIG. 17 is a timing diagram illustrating a connection state and a command execution state in the memory system of the comparison example, in the second operation example.

FIG. 19 is a timing diagram illustrating a connection state and a command execution state in the memory system of the comparison example, in the third operation example.

DETAILED DESCRIPTION

Figure 2:
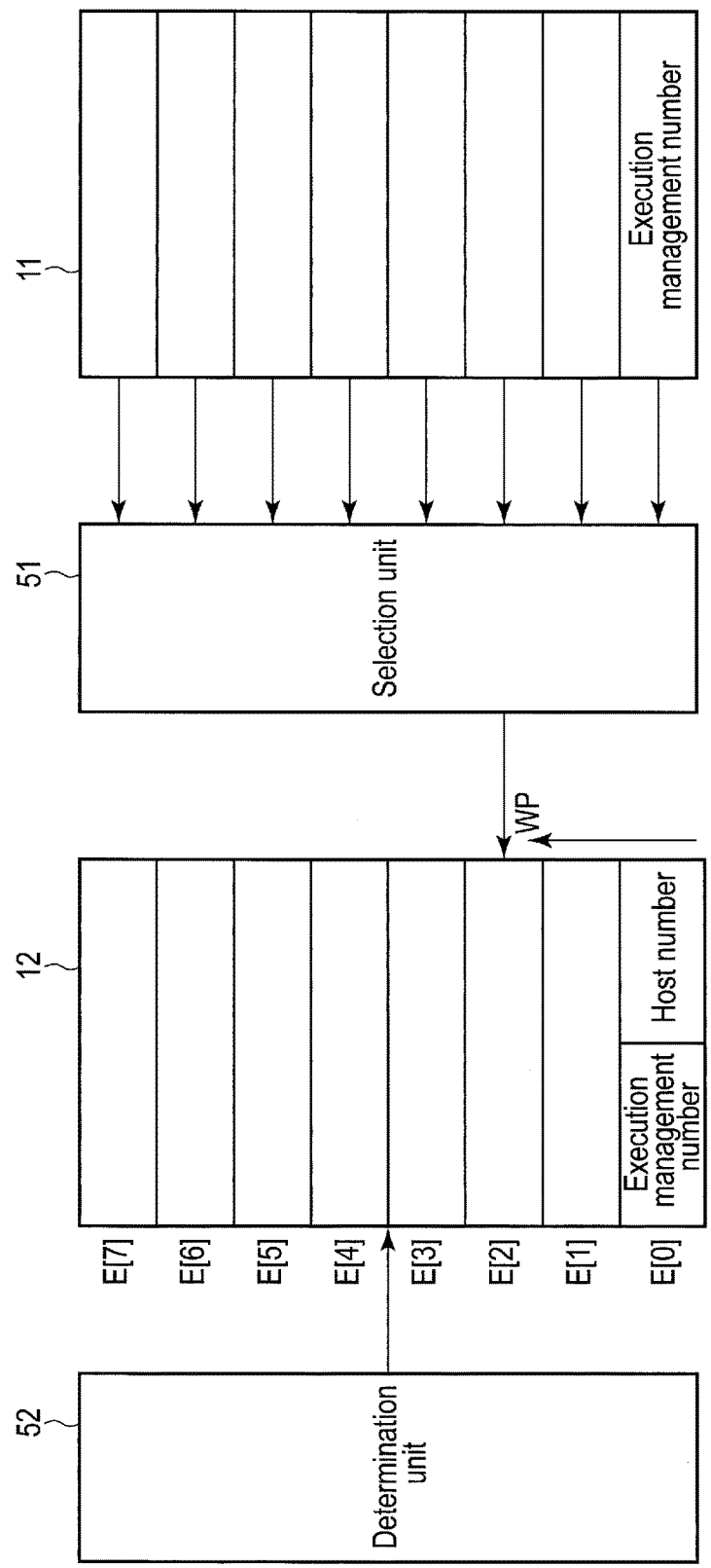
FIG. 2 illustrates an operation carried out by an interface controller of the memory system according to the present embodiment.

In general, according to an embodiment, a memory device includes a memory unit, a communication interface through which commands are received from a plurality of hosts, and a controller configured to store the commands in a queue and determine an order of execution of the commands according to when the commands were added to the queue and whether or not the commands issued from a host that is designated as a priority host. The controller determines the commands issued from the priority host to be executed prior to other commands that were not issued from the priority host, and determines the other commands to be executed in the order they were added to the queue.

Embodiments will be described hereinafter with reference to the accompanying drawings. In the following description, substantially the same functions or structural elements are described with the same numbers, and overlapping explanations will be made only when necessary.

In the following embodiments, a memory system (device) includes a management unit that manages command identification information and determines, from the command identification information, command identification information corresponding to the command to be executed next.

The management of the execution order of commands similar to that of the present embodiment may be also applied to a device which is not a memory system, for example, a communication device.

The management unit functions as a command queuing unit and basically determines command identification information on a first-in first-out (FIFO) basis. However, in the following embodiments, command identification information corresponding to device identification information illustrating an information processor (a host) which is currently communicating with the memory system is preferentially determined. Further, a command corresponding to the determined command identification information is executed.

In the present embodiment, a command to be managed is, for example, a command related to a transfer request.

FIG. 1 is a block diagram of a memory system according to an embodiment.

A memory system 1 is connected to a plurality of information processors $I_0$ to $I_K$. Each of the information processors $I_0$ to $I_K$ operates as a host device of the memory system 1. The memory system 1 may be incorporated into one of the information processors $I_0$ to $I_K$. Alternatively, the memory system 1 may be connected to the information processors $I_0$ to $I_K$, using a wireless or wired communication network. A plurality of memory systems 1 may be connected to the information processors $I_0$ to $I_K$.

The memory system 1 is a memory device such as an SSD. However, a configuration similar to that of the memory system 1 may be applied to various memory devices such as a memory card, an HDD, a hybrid memory device including an HDD and an SSD, and an optical disk.

The memory system 1 includes a nonvolatile memory 2 and a controller 3.

In the present embodiment, the nonvolatile memory 2 includes a NAND flash memory. However, the nonvolatile memory 2 may include a different type of memory which is not a NAND flash memory; for example, the nonvolatile memory 2 may include a NOR flash memory, a magnetoresistive random access memory (MRAM), a phase change random access memory (PRAM), a resistive random access memory (ReRAM), or a ferroelectric random access memory (FeRAM). The nonvolatile memory 2 may also be a magnetic disk.

The controller 3 includes an interface unit 4, an interface controller 5, memories 6A and 6B, a control unit 7, and a memory controller 8. The controller 3 may be divided into, for example, a front end which serves as an interface for communicating with and receiving data, information, a signal, a command, an address, etc. from, the information processors $I_0$ to $I_K$, and a back end which does not serve as the interface. In this case, for example, the front end includes the interface unit 4 and the interface controller 5, and the back end includes memories 6A and 6B, the control unit 7 and the memory controller 8.

The interface unit 4 transmits and receives data, information, signals, commands, addresses, etc., to and from a data port included in one of the information processors $I_0$ to $I_K$ via an expander 41. The expander 41 switches a data port that communicates with the memory system 1. The expander 41 may be provided in the memory system 1.

The interface controller 5 manages execution order of various commands such as a read command, a write command, and an erase command. The interface controller 5 is a hardware controller that includes a selection unit 51, a determination unit 52, and a management unit 53. Specific operations of the interface controller 5 are described below. The selection unit 51, the determination unit 52, and the management unit 53 may be partially or entirely provided outside the interface controller 5.

Memory 6A stores control program 9 executed by the control unit 7 and address translation data 10. The control program 9 and the address translation data 10 may be partially or entirely stored in another memory such as a memory in the control unit 7, and may be partially or entirely stored in the nonvolatile memory 2. The control program 9 may be, for example, an operating system, application program, or firmware. The address translation data 10 associates the logical address corresponding to write data received from one of the information processors $I_0$ to $I_K$ with the physical address of memory 6B or the nonvolatile memory 2. The address translation data 10 is, for example, a look up table (LUT). For example, the address translation data 10 may have a data structure of a table form and associate a logical address with a physical address by a list structure.

Memory 6A may be, for example, a nonvolatile memory. Alternatively, memory 6A may be partially or entirely a volatile memory such as a dynamic random access memory (DRAM) or a static random access memory (SRAM). When memory 6A includes a volatile memory, the program or data stored in the volatile memory may be written to a nonvolatile memory such as the nonvolatile memory 2 at the time of power-off of the memory system 1.

Memory 6B is used as, for example, a working memory. Memory 6B includes a write buffer memory WB and a read buffer memory RB.

The write buffer memory WB temporarily stores write data received from the information processors $I_0$ to $I_K$.

The read buffer memory RB temporarily stores read data read from the nonvolatile memory 2 via the memory controller 8.

Memory 6B may be a volatile memory, a nonvolatile memory, or combination of a nonvolatile memory and a volatile memory.

The memory controller 8 receives data, information, a signal, a command, an address, etc., from various modules such as the control unit 7 and memory 6B, and performs writing, reading, and erasing with respect to the nonvolatile memory 2.

The control unit 7 executes the control program 9 and controls the memory system 3 as a whole. For the control unit 7, for example, a central processing unit (CPU) or a micro-processor unit (MPU) is used.

The control unit 7 receives a command, a logical address, a data size, and write data from the information processors $I_0$ to $I_K$ via the interface unit 4. The control unit 7 stores write data to the write buffer memory WB when a write command is received. When size of write data stored in the write buffer memory WB is suitable for writing to the nonvolatile memory 2, the control unit 7 instructs the memory controller 9 to write the data in the write buffer memory WB to the nonvolatile memory 2.

When write data is stored in the write buffer memory WB, the control unit 7 updates the address translation data 10, associating the logical address corresponding to the write data with a physical address of the write buffer memory WB in which the write data is stored. When data in the write buffer memory WB is written to the nonvolatile memory 2, the control unit 7 further updates the address translation data 10, associating the logical address corresponding to the data with a physical address in the nonvolatile memory 2 to which the data is written. At least a part of the above functions of the control unit 7 may be achieved by hardware.

FIG. 2 illustrates an operation of the interface controller 5 according to the present embodiment.

The interface controller 5 includes, as described above, selection unit 51, the determination unit 52, and the management unit 53.

The management unit 53 manages execution management data 11, order management data 12, and specifying information 17. The execution management data 11, the order management data 12 and the specifying information 17 may be stored in the management unit 53. At least a part of the execution management data 11, the order management data 12, and the specifying information 17 may be stored in a storage unit outside the management unit 53.

The execution management data 11 has, for example, a data structure of a table form. Each entry of the execution management data 11 includes command identification information of commands to be executed (commands waiting for execution). In the present embodiment, command identification information is an execution management number.

The order management data 12 has a data structure suitable for executing commands in accordance with the FIFO system (i.e., chronological order). In the present embodiment, each entry of the order management data 12 includes the execution management number and device identification information indicating an information processor that issued the corresponding command. In the present embodiment, device identification information is a host number. The host numbers and the execution management numbers stored in the order management data 12 are managed in accordance with the FIFO system (i.e., in chronological order). In the order management data 12, the order of the host numbers and the execution management numbers can be changed depending on the need.

The specifying information 17 specifies an information processor (one of the information processors $I_0$ to $I_K$) that is currently communicating with the memory system 1.

The selection unit 51 selects an executable command from the commands corresponding to the execution management numbers included in the execution management data 11. The selection unit 51 selects the executable command employing, for example, a round-robin arbiter. In this case, for example, the selection unit 51 allocates a time slice for each of the execution management numbers included in the execution management data 11 in order. When the command corresponding to the execution management number for which a time slice is allocated is executable (in other words, when the command corresponding to the execution management number for which a time slice is allocated is desired to be executed), the selection unit 51 selects the execution management number of the executable command for which the time slice is allocated.

The selection unit 51 stores the selected execution management number and the host number corresponding to the execution management number in the order management data 12.

The management unit 53 manages the execution management number selected by the selection unit 51 and the host number corresponding to the execution management number for each command issued by one of the information processors. The management unit 53 manages execution management numbers and host numbers such that the execution order of commands can be specified, using, for example, the order management data 12.

When the specifying information 17, which specifies an information processor that is currently communicating with the memory system 1, is not set in the management unit 53, the determination unit 52 determines an execution management number in accordance with the FIFO system to be the execution management number of the command to be executed next. When the specifying information 17 is set in the management unit 53, the determination unit 52 determines an execution management number corresponding to the host number specified by the specifying information 17 to be the execution management number of the command to be executed next.

For example, the determination unit 52 may determine the execution management number of the command to be executed next at the time of command execution. Alternatively, the determination unit 52 may determine the execution management number of the command to be executed next when one of the information processors $I_0$ to $I_K$ begins communication with the memory system 1.

More specifically, for example, the management unit 53 sets the host number corresponding to the executed command as the specifying information 17.

When the command corresponding to an execution management number stored in the order management data 12 is executed, the determination unit 52 determines whether or not an execution management number associated with the same host number as the host number set as the specifying information 17 is stored in the order management data 12.

When an execution management number associated with the same host number as the host number set as the specifying information 17 is not stored in the order management data 12, the determination unit 52 determines an execution management number in accordance with the FIFO system to be the execution management number of the command to be executed next.

When an execution management number corresponding to the same host number as the host number set as the specifying information 17 is stored in the order management data 12, the determination unit 52 determines the execution management number corresponding to the host number to be the execution management number of the command to be executed next.

In other words, when the execution management number is not associated with the host number of the information processor with which connection is currently established, the determination unit 52 determines the execution management number indicating the command to be executed next in accordance with the FIFO system.

In contrast, when the execution management number is associated with the host number of the information processor with which connection is currently established, the determination unit 52 determines the execution management number corresponding to the host number to be the execution management number of the command to be executed next.

In the present embodiment, the state in which connection is established between a plurality of devices is an example of the state in which a plurality of devices is currently communicating with each other.

FIG. 2 illustrates a case in which the number of entries of the execution management data 11 is eight. However, the number of entries of the execution management data 11 is not limited to this number and may be two or more.

Similarly, FIG. 2 illustrates a case in which the number of entries of the order management data 12 is eight. However, the number of entries of the order management data 12 is not limited to this number and may be three or more.

In FIG. 2, the order management data 12 includes entries E[0] to E[7]. In the present embodiment, the execution order of commands is determined by the determination unit 52.

The selection unit 51 selects an execution management number of an executable command from the execution management numbers stored in the execution management data 11. The selection unit 51 selects an execution management number in accordance with, for example, the round-robin system. The selection unit 51 stores the selected execution management number and the corresponding host number in the entry of the order management data 12 indicated by a write pointer WP. When the execution management number and the host number are stored in the entry indicated by the write pointer WP, the selection unit 51 increments the value of the write pointer.

The determination unit 52 determines, from the execution management numbers stored in the order management data 12, the execution management number corresponding to the host number of the information processor with which connection is currently established, in other words, the execution management number associated with the host number specified by the specifying information 17, to be the execution management number of the command to be executed next. When the execution management number corresponding to the host number of the information processor with which connection is currently established is not stored in the order management data 12, the determination unit 52 determines the execution management number of the command to be executed next in accordance with the FIFO system.

Figure 3:
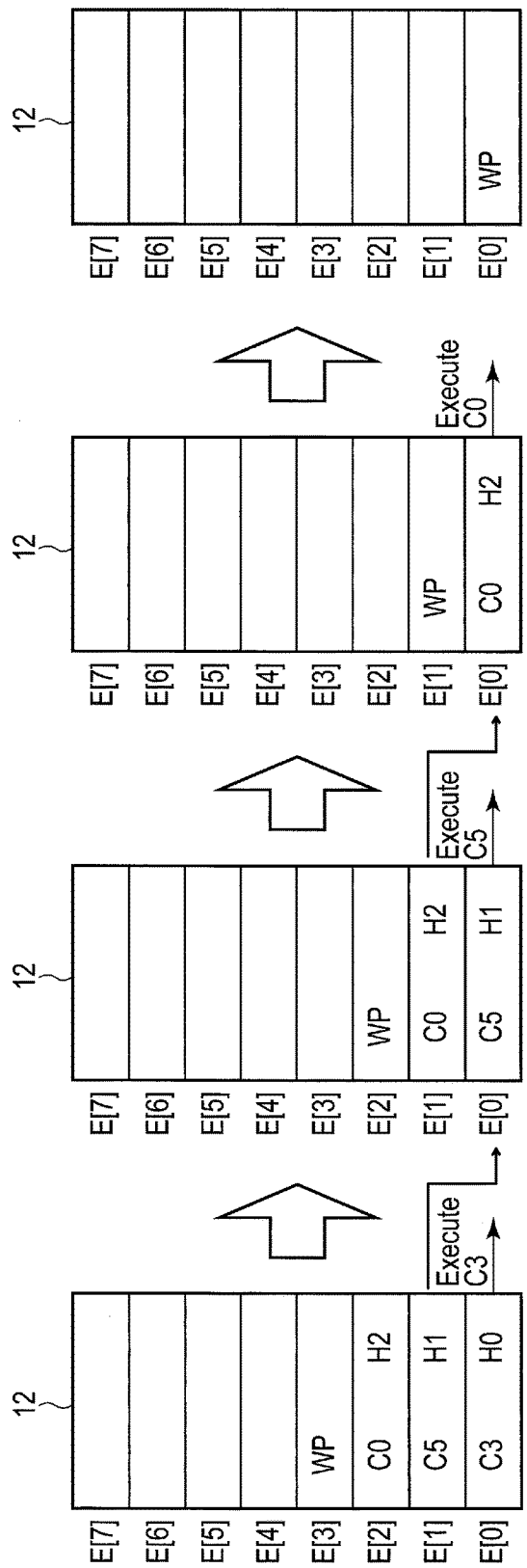
FIG. 3 illustrates state transitions in accordance with a first determination procedure of an execution management number executed by a determination unit of the memory system according to the present embodiment.

FIG. 3 illustrates state transitions in accordance with a first determination procedure of an execution management number executed by the determination unit 52 according to the present embodiment. In FIG. 3, the execution management number of the command to be executed next is determined in accordance with the FIFO system. In the initial state of the order management data 12 in FIG. 3, the write pointer WP points to entry E[3]. Execution management number C3 and host number H0 are stored in entry E[0]. Execution management number C5 and host number H1 are stored in entry E[1]. Execution management number C0 and host number H2 are stored in entry E[2].

Here, the determination procedure of an execution management number based on the FIFO system executed by the determination unit 52 is a basic determination procedure.

Host numbers H0 to H2 stored in entries E[0] to E[2], respectively, are different from the host number of the information processor with which connection is currently established. The specifying information 17 indicates a host number different from host numbers H0 to H2. In this case, the determination unit 52 determines the execution management number of the command to be executed next in the order stored in the order management data 12. For example, when the write pointer WP points to one of entries E[1] to E[7], which is not entry E[0], the determination unit 52 determines execution management number C3 in entry E[0] as the execution management number of the command to be executed next.

After the execution of the command indicated by the determined execution management number C3 is completed, the determination unit 52 transfers the execution management number and the host number of the entry E[i+1] to the execution management number and the host number of the entry E[i] (i≤WP−1). As a result, the entry E[0] stores execution management number C5 and host number H1 of the old entry E[1]. The entry E[1] then stores execution management number C0 and host number H2 of the entry E[2].

After the execution of the command indicated by the determined execution management number C3 is completed, the write pointer WP is decremented. When the write pointer WP is zero, the order management data 12 is in an empty state.

The determination unit 52 determines execution management number C5 in entry E[0] as the execution management number of the command to be executed next. Subsequently, a similar process is repeated.

Figure 4:
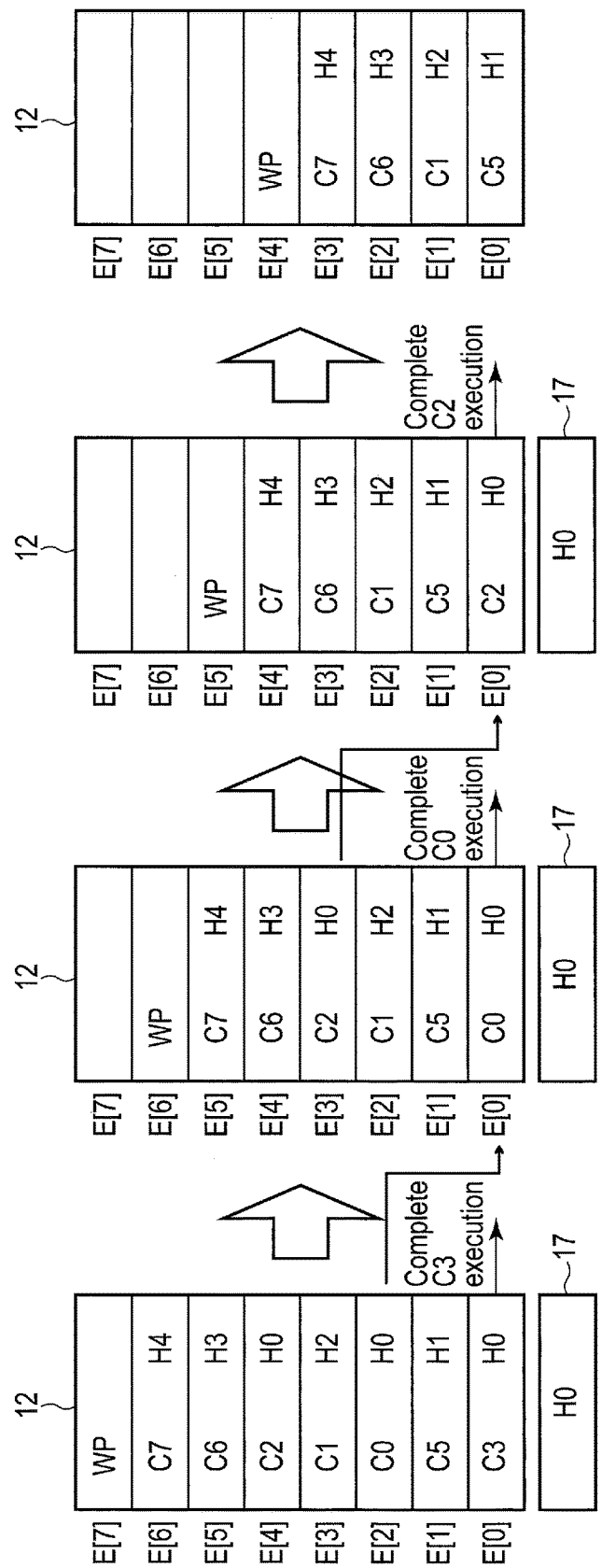
FIG. 4 illustrates state transitions in accordance with a second determination procedure of an execution management number executed by the determination unit.

FIG. 4 illustrates state transitions in accordance with a second determination procedure of an execution management number executed by the determination unit 52 according to the present embodiment. In FIG. 4, the order of execution management numbers is different from the one in FIG. 3.

In the initial state of the order management data 12 in FIG. 4, the same host number H0 is stored in entries E[0], E[2], and E[4]. In FIG. 4, after the execution of a command is completed, a command corresponding to the same information processor as that of the executed command is executed next.

FIG. 4 illustrates an example in which the specifying information 17 indicates host number H0 of the information processor with which connection is currently established. The determination unit 52 searches for an entry (a priority entry) including the host number H0 when the execution of the command indicated by execution management number C3 in entry E[0] is completed. When priority entries are present in entries E[1] to E[7], the determination unit 52 determines the minimum entry number of the detected priority entries as N. When no priority entry is present in entries E[1] to E[7], the determination unit 52 determines that N is zero. In the initial state of the order management data 12 in FIG. 4, N is two. Subsequently, the determination unit 52 transfers execution management number C0 and host number H0 in the entry E[N], here, entry E[2], to the entry E[0] and transfers the execution management number and the host number of entry E[i+1] to entry E[i] (N≤i≤WP−1). The write pointer WP is decremented based on the completion of command execution.

The determination unit 52 determines execution management number C0 in entry E[0] as the execution management number of the command to be executed next. Subsequently, a similar process is repeated.

According to this process, it is possible to continuously execute commands corresponding to the same information processor with which connection is currently established on the basis of the determination procedure illustrated in FIG. 4.

When N is equal to zero, in other words, when the order management data 12 does not have an execution management number corresponding to the information processor with which connection is currently established, the determination procedure based on the FIFO system in FIG. 3 is executed.

To prevent long-time connection between the memory system and specific one of the information processor of the information processors $I_0$ to $I_K$, the interface controller 5 may monitor the connection time using a timer and switch the information processor connected with the memory system 1 when the connection time exceeds a predetermined time.

The interface controller 5 may set an upper limit of executable commands for one connection period, and switch the information processor to be connected with the memory system 1 when the number of commands executed after the establishment of connection exceeds the threshold.

In this manner, it is possible to prevent the number of commands executed for a specific one of the information processors $I_0$ to $I_K$ from being outstandingly greater than the number of commands executed for the other information processors. Thus, the performance can be balanced in the whole system including the information processors $I_0$ to $I_K$ and the memory system 1.

Figure 5:
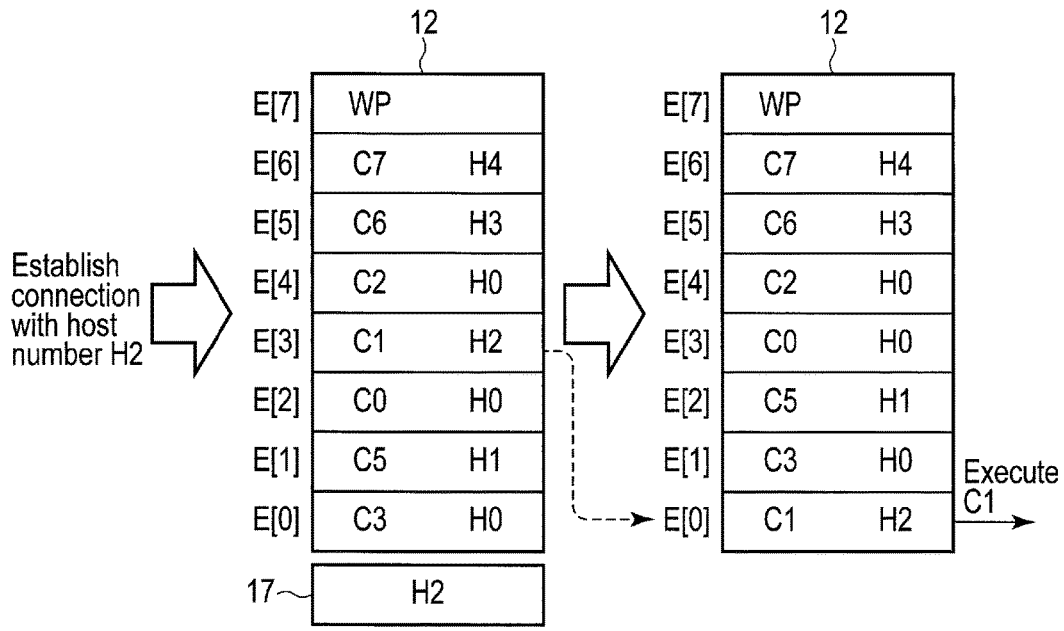
FIG. 5 illustrates state transitions in accordance with a third determination procedure of an execution management number executed by the determination unit.

FIG. 5 illustrates state transitions in accordance with a third determination procedure of an execution management number executed by the determination unit 52 according to the present embodiment. In FIG. 5, the order of execution management numbers is different from the one in FIGS. 3 and 4.

FIG. 5 illustrates the operation performed in the following case. Connection is established between a specific one of the information processors $I_0$ to $I_K$ and the memory system 1. However, the specifying information processor with which connection is established is different from the information processor indicated by the host number in entry E[0] of the order management data 12.

For example, when connection is established based on a request from the information processors $I_0$ to $I_K$, the specifying information of the information processor with which connection is currently established is different from the host number in entry E[0] of the order management data 12.

In the initial state of the order management data 12 in FIG. 5, connection is currently established with the information processor of host number H2. Thus, the specifying information 17 indicates the host number H2. In entry E[0] of the order management data 12, host number H0 is stored.

When the specifying information is different from the host number in entry E[0] of the order management data 12, the determination unit 52 searches for a priority entry, in other words, an entry including host number H2. The determination unit 52 determines the minimum entry number of the detected priority entries as N. In the initial state of FIG. 5, N is three. Subsequently, the determination unit 52 transfers execution number C1 and host number H2 of the entry E[N], here, entry E[3], to the entry E[0], and transfers the execution management number and the host number of entry E[i−1] to the entry E[i] (1≤i≤N). At this time, no command has been executed yet. Thus, the write pointer WP is not decremented.

The determination unit 52 determines execution management number C1 in entry E[0] as the execution management number of the command to be executed next. Subsequently, for example, the determination procedure of FIG. 3 or FIG. 4 is executed.

When N is equal to zero, in other words, when the host number of the information processor with which connection is currently established is not stored in the order management data 12, the switch between entries illustrated in FIG. 5 is not performed.

Figure 6:
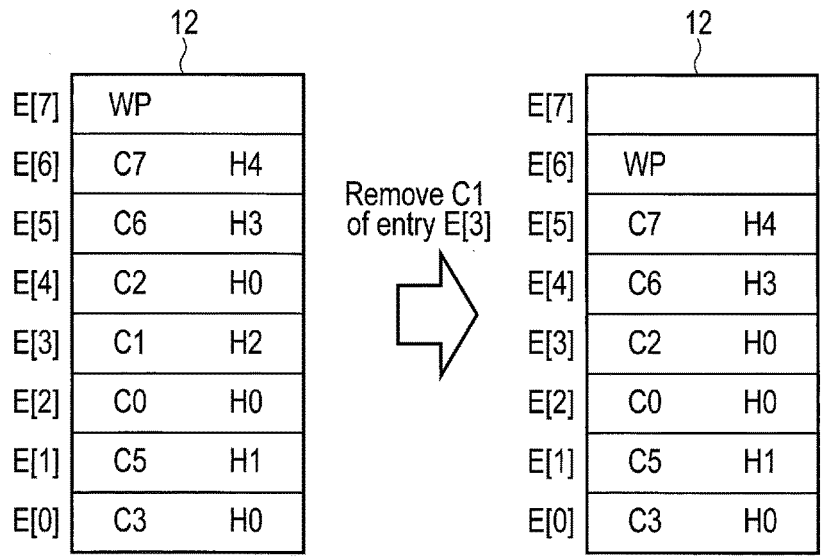
FIG. 6 illustrates a state transition in accordance with a procedure for removing an execution management number executed by the determination unit.

FIG. 6 illustrates a state transition in accordance with a procedure for removing an execution management number in the determination unit 52 according to the present embodiment.

The operation in FIG. 6 is typically executed based on command abort.

The entry number in which the execution management number to be removed is stored is defined as α. FIG. 6 illustrates a case in which execution management number C1 in entry E[3] of the order management data 12 is removed. Thus, α is three.

The determination unit 52 transfers the execution management number and the host number in the entry E[i+1] to the entry E[i] (α≤i≤WP−1). The write pointer WP is decremented.

Figure 7:
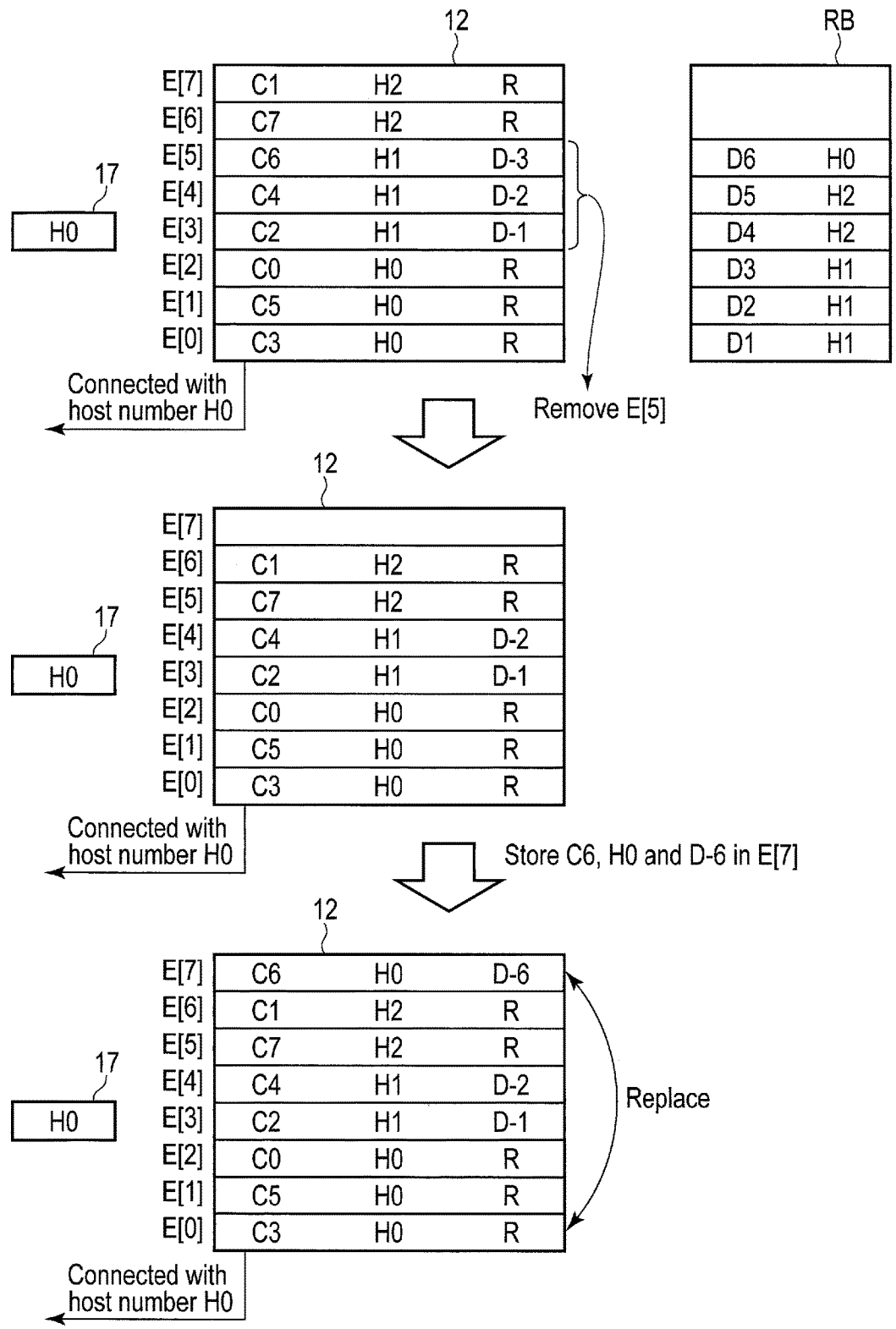
FIG. 7 illustrates state transitions based on a relationship between an order management data and a read data stored in a read buffer memory according to the present embodiment.

FIG. 7 illustrates state transitions based on a relationship between the order management data 12 and the read data stored in the read buffer memory RB according to the present embodiment.

The memory system 1 includes the high-capacity, low-speed nonvolatile memory 2 (for example, a NAND flash memory or a hard disk) and the low-capacity, high-speed read buffer memory RB for adjusting the speed difference from the high-speed interface provided between the information processors $I_0$ to $I_K$ and the memory system 1.

When read data has been already stored in the read buffer memory RB, the read data in the read buffer memory RB is preferably transmitted to an information processor as quickly as possible so that the use efficiency of the read buffer memory RB and the response speed of the whole memory system 1 can be improved.

In FIG. 7, the order management data 12 includes, in each entry, an execution management number, a host number, and frame identification information of information to be transmitted according to the corresponding command. For example, for frame identification information, response information R and data identification information D are used. Response information R indicates that the information to be transmitted is a response. Data identification information specifies that the information to be transmitted is data in the read buffer memory RB.

In the initial state of the read buffer memory RB in FIG. 7, data D1, D2, and D3 corresponding to host number H1, data D4 and D5 corresponding to host number H2, and data D6 corresponding to host number H0 are stored in the read buffer memory RB.

In the initial state of the order management data 12 in FIG. 7, for example, entry E[0] stores execution management number C3, host number H0, and response information R. For example, entry E[3] stores execution management number C2, host number H1, and data identification information D-1, which corresponds to data D1. For example, entry E[5] stores execution management number C6, host number H1, and data identification information D-3, which corresponds to data D3.

In the initial state of the order management data 12, connection is currently established with the information processor having host number H0. Thus, the specifying information 17 indicates host number H0. The determination unit 52 recognizes that the order management data 12 does not include the execution management number of a command for transmitting data to the information processor having host number H0 that is the same as the specifying information 17. The determination unit 52 also recognizes that data D6 corresponding to the information processor having host number H0 has been already stored in the read buffer memory RB.

The determination unit 52 determines that one of entries E[3], E[4], and E[5] including the host number of an information processor with which connection is not currently established and the data identification information indicating one of data items included in the read buffer memory RB is a removal target. FIG. 7 illustrates an example in which entry E[5] is determined as the removal target. The determination unit 52 removes execution management number C6, host number H1, and data identification information D-3 stored in entry E[5]. The removal of information (execution management number C6, host number H1, and data identification information D-3) stored in entry E[5] by the determination unit 52 is not executed based on command abort. However, this removal is executed in accordance with a removal procedure similar to that of FIG. 6. When available entry E is present in the order management data 12, there is no need to remove an existing entry.

Subsequently, the determination unit 52 stores, in available entry E[7], new execution management number C6, host number H0, and data identification information D-6 indicating data D6 to be transmitted to the information processor of host number H0.

Subsequently, the determination unit 52 searches for entry E[7] including host number H0 and data identification information D-6, and determines execution management number C6 stored in the detected entry E[7] as the execution management number of the command to be executed next.

Subsequently, for example, the determination unit 52 interchanges the information (execution management number C3, host number H0, and response information R) stored in entry E[0] and the information (execution management number C6, host number H0, and data identification information D-6) stored in the detected entry E[7]. The determination unit 52 executes execution management numbers C6, C5, C0, and C3 corresponding to host number H0 in series in a manner similar to that of FIG. 4.

Alternatively, for example, the determination unit 52 may execute execution management numbers C3, C5, C0, and C6 corresponding to host number H0 of the information processor with which connection is currently established in series in a manner similar to that of FIG. 4 without interchanging the information stored in entry E[0] and the information stored in entry E[7] after storing, in available entry E[7], new execution management number C6, host number H0, and data identification information D-6. In this case, read data D6 for host number H0 is transmitted after responses to host number H0 are transmitted.

In this manner, a command for transmitting read data stored in the read buffer memory RB is transmitted earlier to the information processor specified by the specifying information 17, with which connection is currently established. Thus, it is possible to improve the use efficiency of the read buffer memory RB and the performance of the whole memory system 1.

FIG. 8 is a flowchart illustrating a process performed between execution of a command and update of entries of the order management data 12. FIG. 8 is equivalent to one state transition in FIG. 4.

In step S801, the memory system 1 executes the command indicated by the execution management number stored in entry E[0] of the order management data 12.

In step S802, the determination unit 52 of the interface controller 5 determines whether or not an execution management number corresponding to the host number same as the host number (i.e., the host number specified by the specifying information 17) corresponding to the executed command is stored in the order management data 12.

When an execution management number corresponding to the same host number is not stored in the order management data 12, the determination unit 52 shifts the information in the entries of the data management data 12 in accordance with the FIFO system in step S803. Then, the process ends.

When one or more execution management numbers corresponding to the same host number are stored in the order management data 12, the determination unit 52 selects the oldest execution management number stored in the order management data 12 from the one or more execution management numbers corresponding to the same host number in step S804.

In step S805, the determination unit 52 stores, in entry E[0] of the order management data 12, the selected execution management number and the host number corresponding thereto.

In step S806, the determination unit 52 shifts the information in entries including an execution management number in the order management data 12 stored after the selected execution management number. The process ends.

Figure 9:
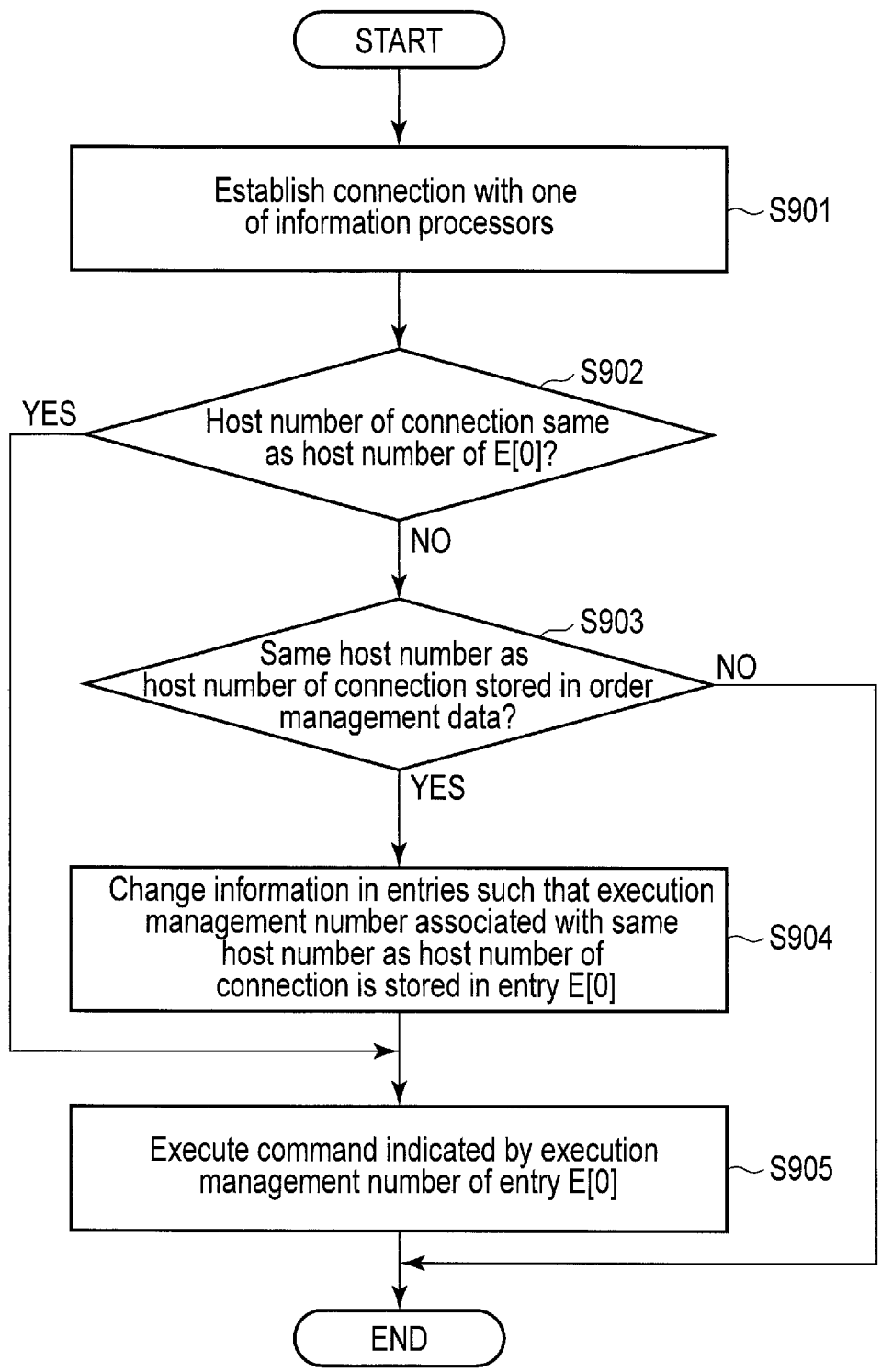
FIG. 9 is a flowchart illustrating another process performed by the memory system according to the present embodiment.

FIG. 9 is a flowchart illustrating a process performed between establishment of connection to an information processor and execution of the command indicated by the execution management number stored in entry E[0] of the order management data 12. FIG. 9 corresponds to the state transitions illustrated in FIG. 5.

In step S901, the memory system 1 establishes connection based on, for example, a request from one of the information processors $I_0$ to $I_K$.

In step S902, the determination unit 52 determines whether or not the host number stored in entry E[0] of the order management data 12 is the same as the host number (i.e., the host number specified by the specifying information 17) of the information processor with which connection is currently established.

When the host number in entry E[0] is the same as the host number of the information processor with which connection is currently established, the process proceeds to step S905.

When the host number in entry E[0] is not same as the host number of the information processor with which connection is currently established, the determination unit 52 determines whether or not an execution management number corresponding to the same host number is stored in the order management data 12 in step S903.

When an execution management number corresponding to the same host number is not stored in the order management data 12, the process of FIG. 9 ends.

On the other hand, when an execution management number corresponding to the same host number is stored in the order management data 12, the determination unit 52 changes the order of the entries of the order management data 12 such that the execution management number corresponding to the same host number is stored in entry E[0] in step S904.

When the determination unit 52 determines that the host number in entry E[0] is the same as the host number of the information processor with which connection is currently established in step S902, or after step S904, the memory system 1 executes the command corresponding to the execution management number stored in entry E[0] in step S905.

FIG. 10 is a flowchart illustrating a process performed when read data requested from a currently-connected information processor is stored in the read buffer RB but a corresponding entry is not stored in the order management data 12. FIG. 10 corresponds to the state transitions illustrated in FIG. 7. That is, an entry for an information processor with which connection is not currently established is removed, and an entry for the currently-connected information processor is newly added in the order management data 12.

In step S1001, the determination unit 52 determines whether or not an execution management number corresponding to a command for transmitting read data to the information processor with which connection is currently established is stored in the order management data 12. The information processor with which connection is currently established is determined based on, for example, the specifying information 17.

When an execution management number corresponding to the command for transmitting the read data to the information processor with which connection is currently established is stored in the order management data 12, the process ends. In this case, no entry is removed.

When an execution management number corresponding to the command for transmitting the read data to the information processor with which connection is currently established is not stored in the order management data 12, the determination unit 52 determines whether or not the read data is stored in the read buffer memory RB in step S1002.

When the corresponding read data to the information processor with which connection is currently established is not stored in the read buffer memory RB, the process ends. In this case, no entry is removed.

When the corresponding read data is stored in the read buffer memory RB, the determination unit 52 removes one of entries having a host number corresponding to an information processor with which connection is not established, and stores, in the available entry of the order management data 12, the execution management number indicating the command for transmitting the read data to the information processor with which connection is currently established in step S1003.

FIG. 11 is a circuit diagram illustrating a structure of a circuit for shifting entries of the order management data 12 according to the present embodiment.

The circuit corresponds to entry E[i] and includes flip-flop circuit F[i], selectors (multiplexers) 13A and 13B, and selector 14.

The selectors 13A, 13B, and 14 output information to be stored in entry E[i] subsequent to replacement to flip-flop F[i] in accordance with various conditions. Flip-flop F[i] retains and outputs the value output by the selector 14. Flip-flop F[i] maintains the value by default.

In FIG. 11, N is the minimum entry number of priority entries as described above. For example, a priority entry is determined based on the specifying information 17. $\alpha$ is the entry number in which the execution management number to be removed is stored.

Specifically, the D-input of flip-flop circuit F[i] is replaced by the Q-output of another entry in accordance with the following conditions.

At the time of completion of command execution, for entry E[i] in which i=0 or N≤i≤WP−1, entry E[i] is replaced by entry E[N] in a case where both i=0 and N≠0 are satisfied, and entry E[i] is replaced by entry E[i+1] in the other cases. (This operation corresponds to that illustrated in FIG. 4.) For example, at the time of completion of command execution, for entry E[i] in which 0≤i≤WP−1, entry E[i] is replaced by entry E[i+1] in a case of N=0. (This operation corresponds to that illustrated in FIG. 3.)

At the time of the establishment of connection, for entry E[i] in which 1≤i≤N, entry E[i] is replaced by entry E[N] in a case of i=0, and entry E[i] is replaced by entry E[i−1] in a case of i≠0. In a case of N=0, there is no entry E[i] satisfying 1≤i≤N. Thus, no entry is replaced. (This operation corresponds to that illustrated in FIG. 5.)

At the time of removal, for entry E[i] in which $\alpha$≤i≤WP−1, entry E[i] is replaced by entry E[i+1]. (This operation corresponds to that illustrated in FIG. 6.)

Hereinafter, a memory system according to a comparison example and the memory system 1 according to the present embodiment are compared.

FIG. 12 generally illustrates an operation carried out in the memory system according to the comparison example.

A memory system 15 of the comparison example causes commands to be queued and executes them. The memory system 15 of the comparison example includes the execution management data 11 and a selection unit 16.

The execution management data 11 includes a plurality of entries in each of which an execution management number corresponding to a command is stored. The number of transmission ports for transmitting a frame during command execution is only one. Therefore, the memory system 15 of the comparison example selects an entry to be executed in series from the plurality of entries in the execution management data 11, using the selection unit 16. The memory system 15 of the comparison example executes the command indicated by the execution management number in the selected entry and transmits a frame such as read data or a response during the command execution.

Figure 13:
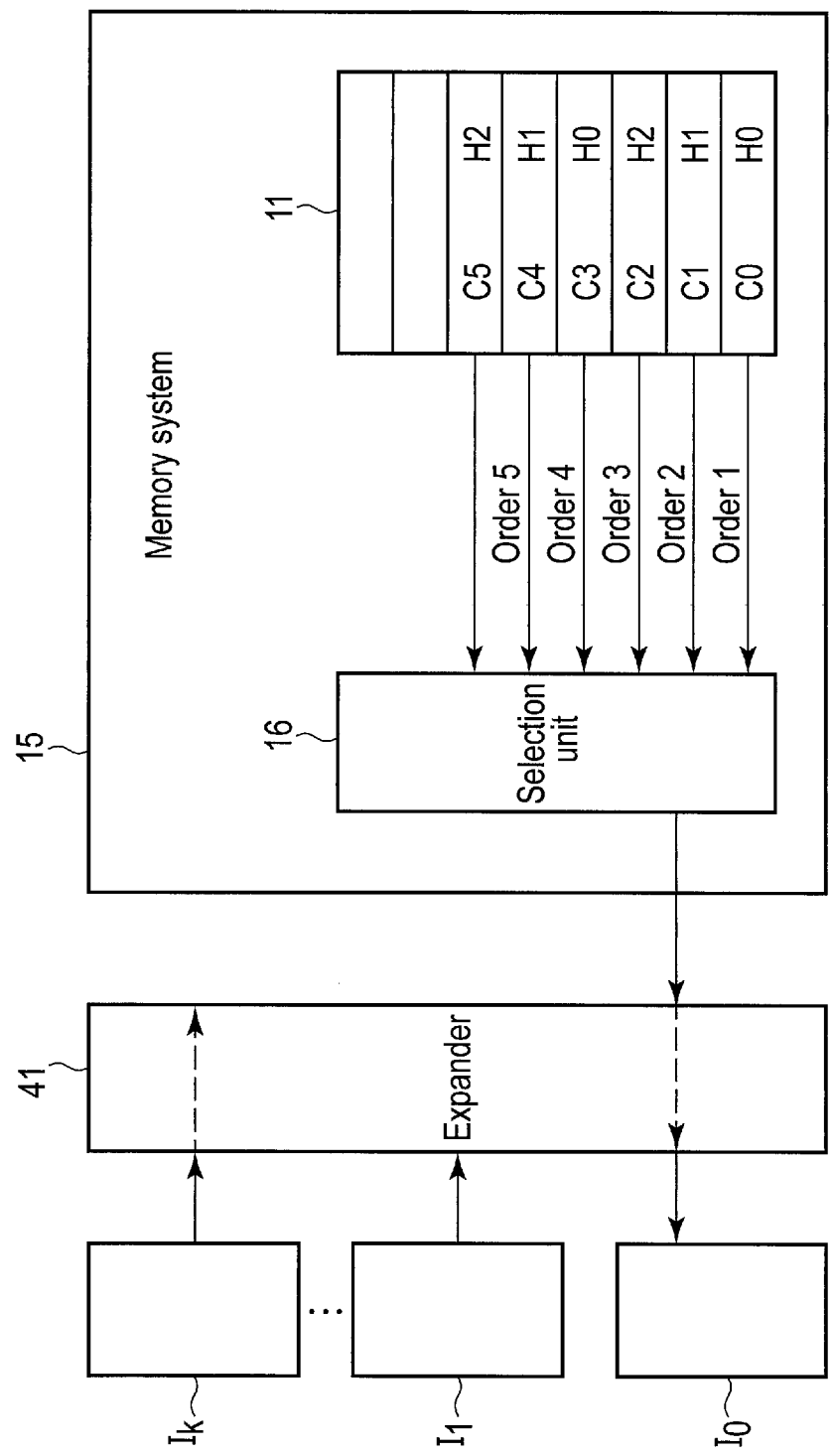
FIG. 13 illustrates a first operation example of an operation carried out by the memory system according to the comparison example.

FIG. 13 illustrates a first operation example of an operation carried out by the memory system 15 including the selection unit 16, which operates based on the round-robin system.

FIG. 14 is a timing chart illustrating a connection state and a command execution state in the memory system 15 of the comparison example, in the first operation example.

Selection unit 16 selects, from entries of the execution management data 12, execution management number C0 and host number H0, execution management number C1 and host number H1, execution management number C2 and host number H2, execution management number C3 and host number H0, execution management number C4 and host number H1, and execution management number C5 and host number H2 in series.

When the host number corresponding to the command to be executed next is different from the host number of the information processor with which connection is currently established, the memory system 15 needs to establish connection with the information processor indicated by the host number corresponding to the command to be executed next.

FIG. 15 is a block diagram illustrating the memory system 15 of the comparison example communicably connected to one of the information processors $I_0$ to $I_K$ via the expander 41.

In the Serial Attached SCSI (SAS), to transmit a frame to one of the information processors $I_0$ to $I_K$, the memory system of the comparison example needs to establish connection with the information processor to which the memory system 15 transmits the frame. However, in environment where a request from one of the information processors $I_0$ to $I_K$ is executed in series via the expander 41, connection is established based on requests from the information processors $I_0$ to $I_K$. Thus, connection may not be established with the information processor to which the memory system 15 transmits the frame.

FIG. 16 illustrates a second operation example of an operation carried out by the memory system 15 of the comparison example.

FIG. 17 is a timing chart illustrating a connection state and a command execution state in the memory system 15 of the comparison example, in the second operation example.

When connection is currently established with the information processor indicated by a host number different from the host number of the target information processor, which is desired to be connected by the memory system 15, the memory system 15 is not be able to execute the command using the connection currently established.

Figure 18:
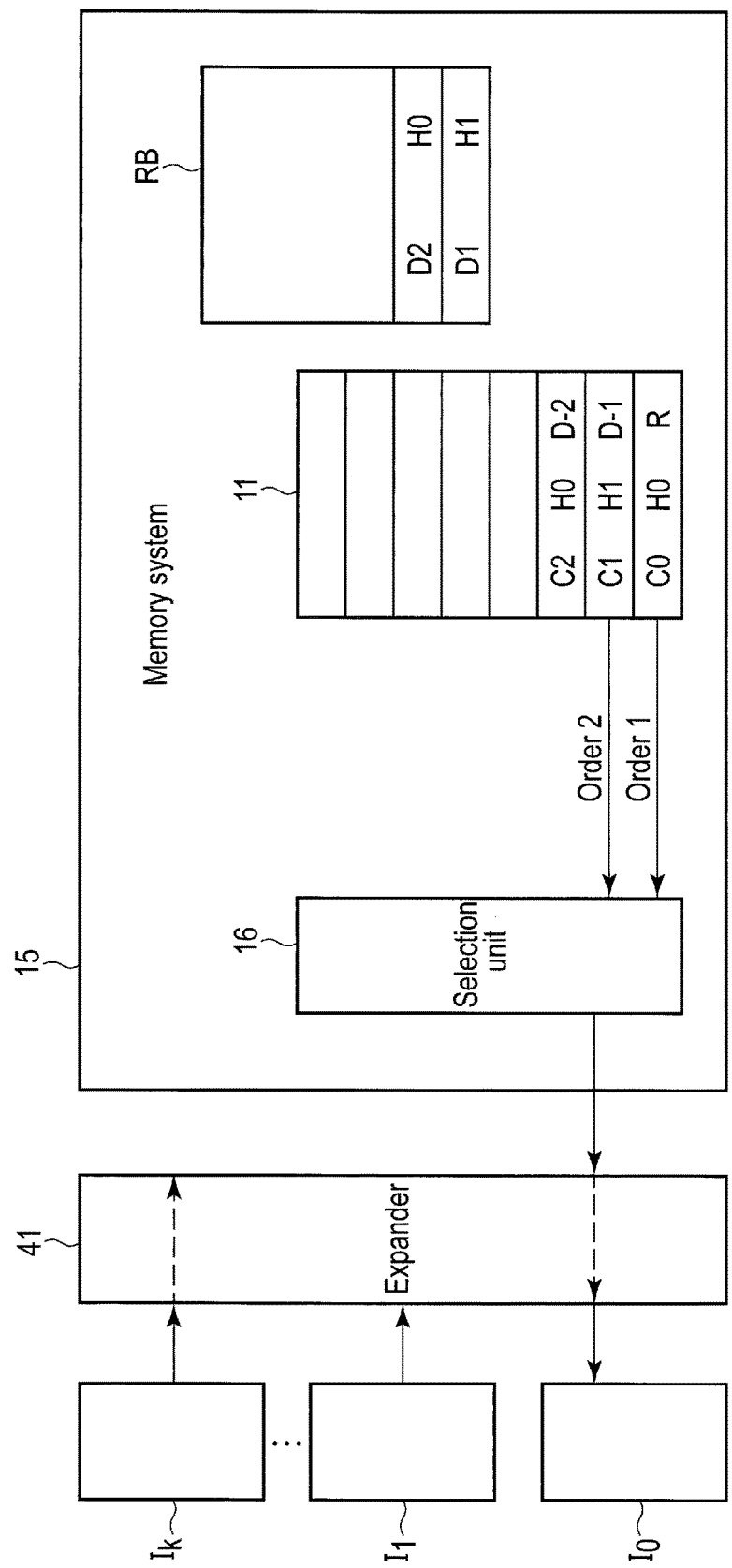
FIG. 18 illustrates a third operation example of an operation carried out by the memory system of the comparison example.

FIG. 18 illustrates a third operation example of the memory system 15 of the comparison example.

FIG. 19 is a timing chart illustrating a connection state and a command execution state in the memory system 15 of the comparison example, in the third operation example.

Here, for example, read data D1 and host number H1, and read data D2 and host number H0 are stored in the read buffer memory RB in a transmission wait state.

The memory system 15 of the comparison example selects an entry including execution management number C0, host number H0, and a response R from the execution management data 11, using selection unit 16. Subsequently, the memory system 15 selects an entry including execution management number C1, host number H1, and data identification information D-1. Subsequently, the memory system 15 selects the entry including execution management number C2, host number H0, and data identification information D-2.

The memory system 15 establishes connection with information processor $I_0$ corresponding to host number H0 and executes a command for transmitting a response based on execution management number C0.

Read data D2 corresponding to host number H0 corresponding to information processor $I_0$, with which connection is currently established, is stored in the read buffer memory RB. However, the memory system 15 can transmit read data D2 to information processor $I_0$ indicated by host number H0 based on execution management number C2 only after the memory system 15 establishes connection with information processor $I_1$ indicated by host number H1 and executes a command for transmitting data D1 based on execution management number C1.

Thus, the memory system 15 of the comparison example may not efficiently improve the use efficiency of the read buffer memory RB and the performance of the whole memory system 1.

In comparison with the memory system 15 of the comparison example, the memory system 1 of the present embodiment selects an execution management number corresponding to the information processor in which connection is currently established from the order management data 12 upon completion of each command execution, and determines an execution management number of the command to be executed next. The memory system 1 executes the command corresponding to the determined execution management number.

According to this operation, it is possible to reduce the number of processes to establish connection and improve the performance in the whole memory system 1.

In the present embodiment, an execution management number corresponding to the information processor with which connection is currently established is selected from the order management data 12, and a command corresponding to the selected execution management number is executed next.

According to this operation, when connection is established in response to a request from an information processor, a command corresponding to the information processor can be executed without re-establishing connection. Thus, the performance can be improved in the whole memory system 1.

In the present embodiment, when read data for the information processor with which connection is currently established is stored in the read buffer memory RB, an entry including an execution management number corresponding to another information processor is removed from the order management data 12. Then, an execution management number indicating a command for transmitting read data to the information processor with which connection is currently established, the corresponding host number, and corresponding data identification information are stored in an available entry of the order management data 12.

According to this operation, the use efficiency of the read buffer memory RB can be improved. Moreover, read data can be preferentially transmitted to the information processor with which connection is currently established. Thus, the performance can be improved in the whole memory system 1.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory device comprising:
    a memory unit;
    a communication interface through which commands are received from a plurality of hosts;
    a read buffer configured to store data read from the memory unit according to commands received from the plurality of hosts; and
    a controller configured to store the commands in a queue and determine an order of execution of the commands according to when the commands were added to the queue and whether or not the commands issued from a host that is designated as a priority host, the priority host being the host in the plurality of hosts that is currently in communication with the memory device, wherein the controller determines, if the data read from the memory unit in connection with a command from the priority host is already stored in the read buffer, the command issued from the priority host is to be executed prior to any other commands that were not issued from the priority host by sorting the commands in the queue when communication is established between the priority host and the memory device, and determines the other commands already in the queue are to be executed in the order they were added to the queue.

2. The memory device according to claim 1, wherein the controller adds commands to the queue upon selecting the commands out of another queue on a round robin basis.

3. The memory device according to claim 1, wherein the controller determines the command from the priority host is to be executed before any other commands in the queue that were not issued from the priority host.

4. The memory device according to claim 1, wherein the controller determines the command from the priority host is to be executed before all of the other commands including any previous commands in the queue that issued from the priority host.

5. The memory device according to claim 1, wherein the command from the priority host replaces another command already in the queue that was not issued from the priority host.

6. The memory device according to claim 1, wherein the controller is configured to monitor how long the priority host has been in communication with the memory device and to switch the communication to another host if the communication time period of the priority host exceeds a threshold.

7. The memory device according to claim 1, wherein the controller is configured to limit the number of commands from the same host that can be executed consecutively.

8. The memory device according to claim 1, wherein the communication between the priority host and the memory device is established due to a communication request issued by the priority host.

9. The memory device according to claim 1, wherein the controller sorts commands in the queue so that a second command is to be executed prior to the other commands in the queue when an execution of a first command is completed, the first command and the second command both being received from the priority host.

10. A method of operation of a memory device having a memory unit, said method comprising:

receiving commands at a communication interface of the memory device from a plurality of hosts;

storing data read from the memory unit according to the commands received from the plurality hosts in a read buffer;

storing the commands in a queue; and determining an order of execution of the commands according to when the commands were added to the queue and whether or not the commands issued from a host that is designated as a priority host, the priority host being the host in the plurality of hosts that is currently in communication with the memory device, wherein, if the data read from the memory unit in connection with a command from the priority host is already stored in the read buffer, the command issued from the priority host is executed prior to any other commands that were not issued from the priority host by sorting the commands in the queue when communication is established between the priority host and the memory device, and the other commands already in the queue are executed in the order they were added to the queue.

11. The method according to claim 10, wherein commands are added to the queue upon selecting the commands out of another queue on a round robin basis.

12. The method according to claim 10, wherein the command from the priority host is executed before any other commands in the queue that were not issued from the priority host.

13. The method according to claim 10, wherein the command from the priority host is executed before all of the other commands in the queue including any previous commands in the queue that issued from the priority host.

14. The method according to claim 10, wherein the command from the priority host replaces another command already in the queue that was not issued from the priority host.

15. The method according to claim 10, further comprising:

monitoring how long the priority host has been communicating with the memory device; and switching the communication to another host if the communication time period of the priority host exceeds a threshold.

16. The method according to claim 10, wherein the number of commands from the same host that can be executed consecutively is limited.

17. The method according to claim 10, wherein the communication between the priority host and the memory device is established due to a communication request issued by the priority host.

18. The memory device according to claim 8, wherein the queue is a FIFO queue, the FIFO queue comprises a plurality a flip-flop circuits, and the controller sorts the commands in the queue by changing an input to each flip-flop when the communication is established between the priority host and the memory device or when the execution of the first command is completed.

* * * * *